United States Patent
Doerr et al.

(10) Patent No.: US 6,829,893 B2
(45) Date of Patent: Dec. 14, 2004

(54) COMPRESSOR ARRANGEMENT, PARTICULARLY FOR COMMERCIAL VEHICLES, HAVING AN AUXILIARY COMPRESSOR UNIT

(75) Inventors: Wolfgang Doerr, Eichenau (DE); Eduard Gerum, Rosenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/712,293

(22) Filed: Nov. 14, 2003

(65) Prior Publication Data

US 2004/0151606 A1 Aug. 5, 2004

(30) Foreign Application Priority Data

Nov. 14, 2002 (DE) .......................................... 102 52 975

(51) Int. Cl.[7] ................................................ F02B 33/44
(52) U.S. Cl. ........................ 60/605.1; 417/43; 417/364
(58) Field of Search .......................... 60/605.1; 417/364, 417/43, 44.2, 45

(56) References Cited

U.S. PATENT DOCUMENTS

| 1,376,467 | A | | 5/1921 | Simmon | |
|---|---|---|---|---|---|
| 4,041,708 | A | * | 8/1977 | Wolff | ........................ 60/649 |
| 4,729,225 | A | * | 3/1988 | Bucher | ........................ 60/608 |
| 5,306,116 | A | * | 4/1994 | Gunn et al. | .................... 415/27 |
| 5,361,593 | A | * | 11/1994 | Dauvergne | ...................... 62/89 |
| 5,906,480 | A | | 5/1999 | Sabelstrom et al. | |
| 6,363,732 | B1 | * | 4/2002 | Bluhm | ...................... 62/196.4 |

FOREIGN PATENT DOCUMENTS

| DE | 720050 | 3/1942 |
|---|---|---|
| DE | 695 10 177 T2 | 11/1999 |
| DE | 199 39 200 A1 | 12/2000 |
| EP | 0165376 A2 | 12/1985 |

OTHER PUBLICATIONS

Article entitled "Hochleistungs–Kompressoren" by Knorr–Bremse System fuer Nutzfahrzeuge.

* cited by examiner

*Primary Examiner*—Hoang Nguyen
(74) *Attorney, Agent, or Firm*—Crowell & Moring LLP

(57) ABSTRACT

An internal-combustion engine for generating a rotational movement is provided to drive a compressor unit which is connected on the output side, for generating compressed air from ambient air. A control unit triggers the generating of compressed air when compressed air is demanded. An auxiliary compressor unit covers peak demands for compressed air and is fluidically connected in parallel with respect to the internal-combustion-engine-driven compressor unit. The auxiliary compressor unit is driven by an electric motor. The control unit starts the operation of the auxiliary compressor unit in the event of a detected peak demand.

15 Claims, 1 Drawing Sheet

COMPRESSOR ARRANGEMENT, PARTICULARLY FOR COMMERCIAL VEHICLES, HAVING AN AUXILIARY COMPRESSOR UNIT

BACKGROUND AND SUMMARY OF THE INVENTION

This application claims the priority of German Application No. 102 52 975.2, filed Nov. 14, 2002, the disclosures of which is expressly incorporated by reference herein.

The present invention relates to a compressor arrangement, particularly for commercial vehicles, having an internal-combustion engine for generating a rotating movement, which internal-combustion engine drives a compressor unit, which is connected on the output side. The compressor unit generates compressed air from the ambient air. A control unit triggers the generating of compressed air when compressed air is required.

Particularly in the field of commercial vehicle construction, compressor arrangements of this type are used in order to provide compressed air for the on-board pneumatic system of a commercial vehicle. The pneumatic system on board a commercial vehicle is required particularly for supplying the brake system, the air suspension, the trailer, and diverse accessories. For this purpose, the compressor arrangement of a commercial vehicle generates compressed air of approximately 12.5 bar.

The product information "High-Performance Compressors" of the firm Knorr-Bremse Systeme für Nutzfahrzeuge GmbH (Printing No. P-3505-DE-01) discloses a compressor unit which is constructed in the manner of a piston compressor. A crankshaft rotatingly disposed in a compressor housing converts a rotating movement on the input side, by means of the principle of a crankshaft drive, into a linear back and forward (reciprocating) motion of an assigned piston, which is housed in a cylinder. The piston, interacting with a valve device housed in the cylinder cover, takes in ambient air and subsequently delivers the latter in a compressed manner. The compressor unit can be obtained in a single- or multi-cylinder construction variant. The multi-cylinder construction variant is suitable for pneumatic systems with a relatively high consumption of compressed air and, correspondingly, has a higher delivery capacity.

In a generally known manner, the compressor unit is driven by way of the internal-combustion engine of the commercial vehicle. In most application cases, a rotational-speed-gearing transmission unit is connected between the internal-combustion engine and the compressor unit. In this case, the transmission unit is constructed as a spur gear system with a fixed transmission ratio in order to gear up the rotational speed generated by the internal-combustion engine to a transmission ratio of normally 1.5, so that the compressor unit mounted on the output side of the transmission unit can be operated at the permissible rotational speed. The transmission unit of the compressor unit is usually integrated directly in the vehicle transmission of the commercial vehicle.

In addition, such known compressor arrangements are provided with technical measures for saving energy. Thus, the operation of the above-described known compressor arrangement takes place by way of a control which ensures that the compressor unit starts its operation only if a compressed-air demand exists in the pneumatic system of the commercial vehicle. In most cases, the compressed-air demand is determined by way of a pressure sensor connected with the system pressure. If the system pressure falls below a defined threshold pressure, the operation of the compressor unit is started in order to again build up a sufficient air pressure. For storing the built-up pressure, pressure vessels (tanks) are customarily used in the case of the pneumatic system.

In order to implement such a demand control for starting the operation of the compressor unit, the compressor unit can be switched between a delivery phase and an idling phase. In the delivery phase, the compressed air is generated from ambient air and is fed into the pneumatic system. In contrast, the compressor unit runs without any load in the idling phase, so that, although a piston movement is carried out, no compressed air reaches the pneumatic system. This compressed air is discharged to the outside. Since, because of the eliminated load, much less power is absorbed by the compressor unit in the idling phase than in the delivery phase, this type of air demand control contributes to the saving of energy.

However, long-term tests have shown that this air-demand-controlled compressor arrangement is often operated with very short switch-on durations of from 5–10% in the delivery phase, which is the result of the predominantly long-distance hauling operation that occurs on the autobahn or highways. With such a short switch-on duration, the comparatively high switch-on duration of approximately 90% in the idling phase becomes much more important so that, as a result of the still considerable power consumption in the idling phase, on the whole, the energy consumption is higher in the idling operation than in the load operation. This result is also intensified by the fact that the compressor unit is often overdimensioned (oversized) for the normal operation in order to generate a high pressure in the pneumatic system within a very short time. This takes place particularly during the charging of the pneumatic system when the pressure tanks are empty, during the operation of the lifting axles, etc. On the whole, the known air demand control therefore still has fairly unsatisfactory results with respect to the saving of energy.

Furthermore, an air demand control of a compressor arrangement is generally also known in the state of the art which uses a mechanically operable separating clutch between the engine unit and the compressor unit. The compressor unit will be stopped by the use of the separating clutch when there no longer is a demand for compressed air. However, in comparison to a continuous idling, a compressor unit operated in such a manner is subjected to high wear as a result of an absence of a lubricating effect during the cold start. In addition, the mechanically operable separating clutch required for this air demand control is also subjected to wear so that, on the whole, fairly high maintenance expenditures are required in the case of this alternative known solution for saving energy.

It is therefore an object of the present invention to further improve an air-demand-controlled compressor arrangement of the above-mentioned type such that a more effective savings of energy of the compressor arrangement is achieved while the maintenance expenditures are simultaneously minimal.

Based on an air-demand-controlled compressor arrangement for generating compressed air from the ambient air, including a control unit for triggering the generating of compressed air when compressed air is demanded.

This object is achieved by providing an auxiliary compressor unit for covering peak demands for compressed air, which is fluidically connected in parallel with respect to the internal-combustion-engine-driven compressor unit and is driven by an electric motor. The control unit starts the operation of the auxiliary compressor unit in the event of a detected peak demand.

The invention includes the technical teaching that an auxiliary compressor unit is provided for covering peak demands for compressed air, which is fluidically connected parallel to the internal-combustion-engine-driven compressor unit and is driven by an electric motor. The control unit starts the operation of the auxiliary compressor unit in the event of a detected peak demand.

The advantage of the solution according to the invention is in particular that a smaller-dimensioned (main) compressor unit can be used, which is driven by the internal-combustion engine of the commercial vehicle. Such an internal-combustion-engine-driven compressor unit has a correspondingly lower power consumption in the idling phase and can be operated more effectively in the load phase, specifically, with a longer switch-on duration. Furthermore, the smaller-dimensioned internal-combustion-engine-driven compressor unit also requires a smaller space in the engine compartment of the commercial vehicle.

The control unit preferably controls the auxiliary compressor unit directly by switching the electric motor connected on the input side on and off. This type of control has the effect that, in the idling phase, the auxiliary compressor unit consumes no power at all, which results in a further savings of energy. The control unit is preferably integrated in the conventional electronic air processing unit of the commercial vehicle (EAC="Electronic Air Control").

According to another measure improving the invention, the auxiliary compressor unit, together with the electric motor, is constructed as a system module within the scope of the compressor arrangement. Thus, depending on the application, this system module can optionally be connected to a compressed-air pipe which can be blocked in the area of a branching-off connection piece. This measure results in lower application expenditures in the case of the internal-combustion-engine operated compressor unit because the same type of compressor unit can be used in the case of a broader vehicle variant. As a function of the type of commercial vehicle or the existing air demand, additionally, an electrically driven auxiliary compressor unit in a simple manner can be installed or not be installed. For this purpose, it should only be observed that a corresponding connection piece for the electric-motor-driven auxiliary compressor unit is preferably provided in the area of the compressed-air pipe leaving the internal-combustion-motor-driven compressor unit.

Furthermore, the system module consisting of the auxiliary compressor unit and the electric motor may be detachably fastened to the chassis of the commercial vehicle. This detachable connection can preferably be established in the form of a screwed connection, which ensures a simple mounting and demounting.

Preferably, a transmission unit is connected between the internal-combustion engine and the compressor unit. The transmission unit is used for adapting the rotational speed spectrum of the compressor unit to the rotational speed spectrum of the internal-combustion engine.

Likewise, if required, a transmission unit may also be connected between the electric motor and the auxiliary compressor unit in order to adapt the rotational speed spectrum of the auxiliary compressor unit to the rotational speed spectrum of the electric motor. Furthermore, this transmission unit may also be directly integrated in the electric motor which, to this extent, is constructed as a standardized electric transmission motor. The electric motor for driving the auxiliary compressor unit, which is constructed as an electric transmission motor, can, in addition, be combined in a particularly simple manner with the auxiliary compressor unit to form a system module.

According to another measure improving the invention, it is provided that the charging of an empty pressure tank—for example, after a long stoppage of a commercial vehicle overnight—takes place to a sufficient pressure level, which can be defined by way of the control unit, exclusively by using the electric-motor-driven auxiliary compressor unit. As a result, a delivery of compressed air can take place by way of the vehicle battery even when the internal-combustion engine is stopped. The charging of the pressure tank for starting the operation of a commercial vehicle can therefore be implemented while generating minimal noise, which is desirable particularly in the case of commercial vehicles parked overnight in residential areas. In this case, the charging of the empty pressure tank can take place in a time-controlled manner by way of the control unit. The electric-motor-driven auxiliary compressor unit is operated for a defined time period, so that a pressure level is generated in the pressure tank which is sufficient after the expiration of this time period and which permits an immediate departure of the commercial vehicle without requiring another time period for the internal-combustion engine-operated compressor unit to generate additional compressed air.

According to another measure improving the invention, in the event of a failure of the internal-combustion-engine-operated compressor unit, the electric-motor-driven auxiliary compressor unit can take over an emergency function in the sense of a redundant system. This is triggered by the control unit which, in the event of a failure of the internal-combustion-engine-operated compressor unit, covers the compressed-air demand at least partially by controlling the auxiliary compressor unit operated by the electric motor.

Other objects, advantages and novel features of the present invention will become apparent from the following detailed description of the invention when considered in conjunction with the accompanying drawings.

BRIEF DESCRIPTION OF THE DRAWING

The FIGURE is a basic schematic representation of the construction of a compressor arrangement according to the invention in the form of a block diagram.

DETAILED DESCRIPTION OF THE DRAWING

Figure 1:
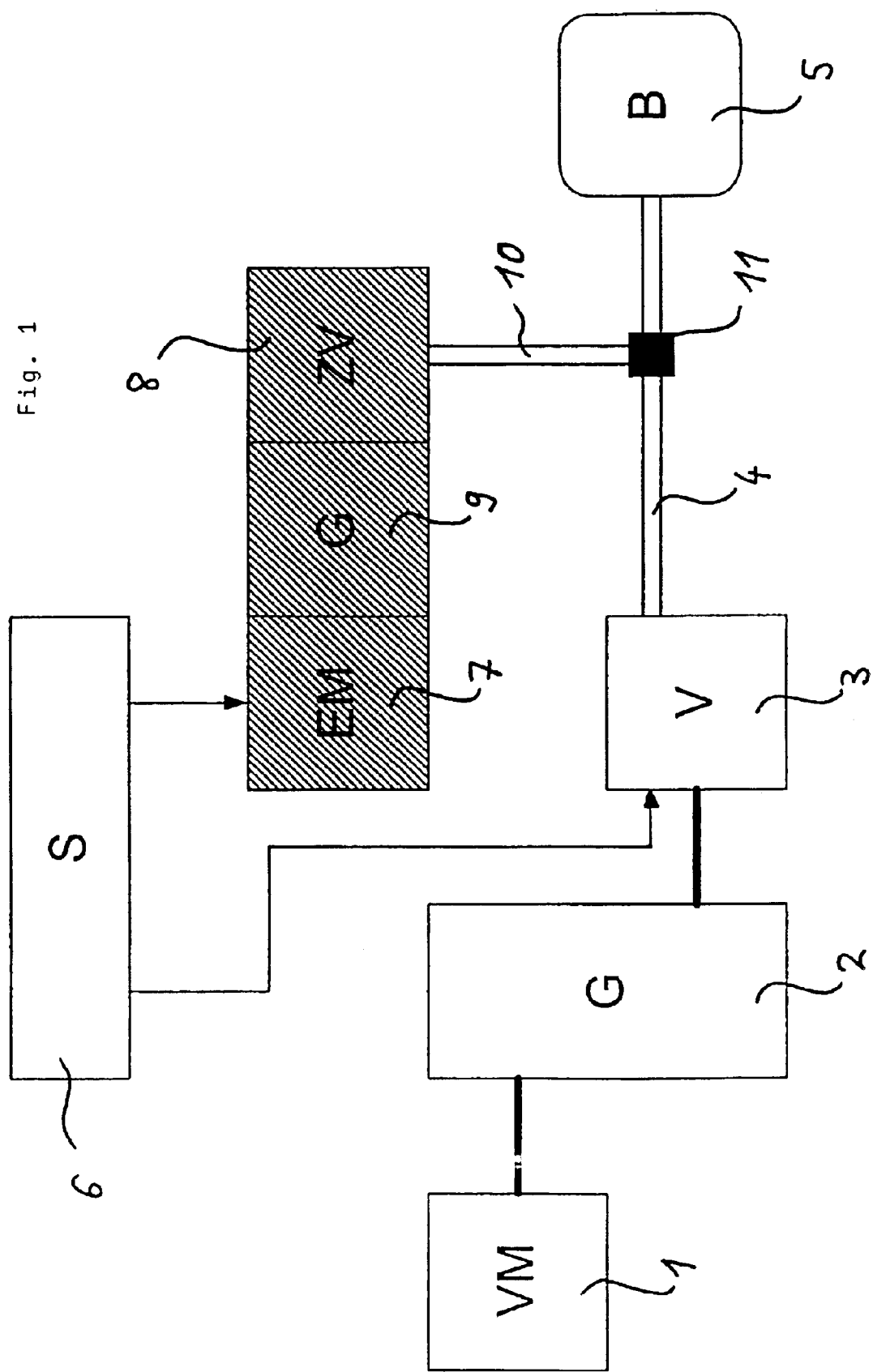

The compressor arrangement is comprised of essentially an internal-combustion engine 1 for generating a rotational movement, which is fed to a transmission unit 2 connected on the output side in order to adapt the rotational speed of the internal-combustion engine 1 corresponding to the required rotational speed for a compressor unit 3 connected on the output side; that is, in order to transpose it. The transmission unit 2 is constructed as a spur gear system. The compressor unit 3 arranged on the output side of the transmission unit 2 utilizes the input-side rotational movement in a conventional manner for generating compressed air from the ambient air. In this embodiment, the compressor unit 3 is constructed as a piston compressor, which is known per se. The compressed air generated by the compressor unit 3, on the output side, is supplied by way of a compressed-air pipe 4 to a pressure tank 5 of a pneumatic system (not shown here) of the commercial vehicle.

Furthermore, a control unit 6 is provided which triggers the generating of compressed air of the compressor arrangement in a conventional manner, so that detailed comments are not required at this point.

In parallel with the compressor unit 3 driven by the internal-combustion engine, the compressor arrangement comprises an auxiliary compressor unit 8 driven by an electric motor 7. The auxiliary compressor unit 8 is used for covering peak demands for compressed air which cannot be serviced by the compressor unit 3 driven by the internal-combustion engine. For this purpose, the control unit 6 starts the operation of the auxiliary compressor unit 8 in the event of a determined peak demand. This peak demand can be determined, for example, by way of a pressure sensor (which is not shown here) which detects the system pressure, in conjunction with an analysis in the control unit 6. The control unit 6 controls the auxiliary compressor unit 8 indirectly by switching the electric motor 7 connected on the input side on and off. A transmission unit 9 is provided between the electric motor 7 and the auxiliary compressor unit 8 in order to adapt the rotational speed spectrum of the auxiliary compressor unit 8 to the rotational speed spectrum of the electric motor 7. The compressed-air pipe 10 provided on the output side of the auxiliary compressor unit 8 leads into a connection piece 11 branching off the compressed-air pipe 4. The connection piece 11 can be shut off by way of a corresponding valve arrangement in order to connect the system module (hatched), which consists of the auxiliary compressor unit 8 with the transmission unit 9 and the electric motor 7, depending on the application, optionally to the branching-off connection piece 11.

As a result, a fluidically parallel-connected compressed-air feeding of the pressure tank 5 is ensured by using the internal-combustion-engine-driven compressor unit 3 as well as the auxiliary compressor unit 8, which are controlled in a coordinated manner by the control unit 6 in order to save energy. Peak demands for compressed air, which can no longer be covered by the compressor unit 2 operated by the internal-combustion engine, can be covered by the auxiliary compressor unit 8 driven by the electric motor. The energy savings result from a compressor unit 3 having smaller dimensions, which compressor unit 3 consumes relatively little power in its idling phase, which on the whole contributes to the saving of energy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

Table of Reference Numbers

1 Internal-combustion engine
2 transmission unit
3 compressor unit
4 compressed-air pipe
5 pressure vessel
6 control unit
7 electric motor
8 auxiliary compressor unit
9 transmission unit
10 compressed-air pipe
11 connection piece

What is claimed is:

1. A compressor arrangement, comprising:

an internal-combustion engine that generates a rotational movement;

a compressor unit arranged on an output side of the engine and being driven by the rotational movement, the compressor unit generating compressed air from ambient air;

a control unit coupled to the compressor unit for triggering the generation of compressed air upon demand;

an auxiliary compressor unit that covers peak compressed air demands, the auxiliary compressor unit being fluidically connected in parallel with the compressor unit and being driven by an electric motor; and wherein the control unit controls the operation of the auxiliary compressor unit in an event of a detected peak demand.

2. The compressor arrangement according to claim 1, wherein the control unit indirectly controls the auxiliary compressor unit by switching the electric motor connected on an input side of the auxiliary compressor unit on and off.

3. The compressor arrangement according to claim 1, wherein the auxiliary compressor unit, together with the electric motor, is constructed as a system module which, depending upon an application, is optionally connectable to a compressed-air pipe which is blockable in an area of a branching-off connection piece.

4. The compressor arrangement according to claim 3, wherein the system module is detachably fastened to a chassis of a commercial vehicle.

5. The compressor arrangement according to claim 1, further comprising a transmission unit arranged between the internal-combustion engine and the compressor unit in order to adapt a rotational speed spectrum of the compressor unit to a rotational speed spectrum of the internal-combustion engine.

6. The compressor arrangement according to claim 1, further comprising a transmission unit arranged between the electric motor and the auxiliary compressor unit in order to adapt a rotational speed spectrum of the auxiliary compressor unit to a rotational speed spectrum of the electric motor.

7. The compressor arrangement according to claim 5, further comprising a second transmission unit arranged between the electric motor and the auxiliary compressor unit in order to adapt a rotational speed spectrum of the auxiliary compressor unit to a rotational speed spectrum of the electric motor.

8. The compressor arrangement according to claim 1, wherein the compressor unit, as well as the auxiliary compressor unit, are connected with a pressure tank for storing compressed air which is fluidically connected on an output side of the compressor units.

9. The compressor arrangement according to claim 8, wherein charging of an empty pressure tank to a sufficient pressure level, which is definable by way of the control unit, takes place when the internal-combustion engine is stopped, exclusively by using the auxiliary compressor unit driven by the electric motor.

10. The compressor arrangement according to claim 9, wherein the charging of the empty pressure tank takes place in a time-controlled manner by way of the control unit.

11. The compressor arrangement according to claim 1, wherein in an event of a failure of the compressor unit driven by the internal-combustion engine, the control unit covers any compressed-air demand to the extent of an emergency function at least partially by controlling the electric-motor-driven auxiliary compressor unit.

12. The compressor arrangement according to claim 1, wherein the electric-motor-driven auxiliary compressor unit is constructed in the manner of a two-step compressor unit.

13. The compressor arrangement according to claim 1, wherein the control unit is integrated in an electronic air processing unit of a commercial vehicle.

14. A method of charging a pressure tank of a pneumatic system in a commercial vehicle, the method comprising the acts of:

provuding an internal-combustion engine driven compressor unit coupling with the pressure tank;

providing an electric motor driven auxiliary compressor unit in parallel to the internal-combustion engine driven compressor unit and coupled to the pressure tank;

when the internal-combustion engine of the commercial vehicle is stopped, charging the pressure tank to a sufficient pressure level definable by way of a control unit exclusively using the auxiliary compressor unit driven by the electric motor.

15. The method according to claim 14, wherein the charging act further comprises the act of charging the pressure tank in a timed-control manner by way of the control unit.

* * * * *